(12) United States Patent
Burright et al.

(10) Patent No.: US 11,130,223 B2
(45) Date of Patent: Sep. 28, 2021

(54) BASE FOR A ROBOTIC ARM

(71) Applicant: Pearson Packaging Systems, Spokane, WA (US)

(72) Inventors: Joshua A. Burright, Spokane, WA (US); Derick Charles Baker, Liberty Lake, WA (US); Shawn Lowell Cheney, Nine Mile Falls, WA (US); Arie Edmund Nordwig, Vernon Hills, IL (US)

(73) Assignee: Pearson Packaging Systems, Spokane, WA (US)

( * ) Notice: Subject to any disclaimer, the term of this patent is extended or adjusted under 35 U.S.C. 154(b) by 340 days.

(21) Appl. No.: 16/175,797

(22) Filed: Oct. 30, 2018

(65) Prior Publication Data
US 2019/0126462 A1    May 2, 2019

Related U.S. Application Data

(60) Provisional application No. 62/579,115, filed on Oct. 30, 2017.

(51) Int. Cl.
*B25J 9/00* (2006.01)
*B65G 47/90* (2006.01)
*F16M 11/24* (2006.01)

(52) U.S. Cl.
CPC ............ *B25J 9/0009* (2013.01); *B25J 9/0093* (2013.01); *B65G 47/90* (2013.01); *F16M 11/24* (2013.01)

(58) Field of Classification Search
CPC ....... B25J 9/0009; B25J 9/0093; B65G 47/90; F16M 11/24; F16M 11/043–048; B01J 19/0066

USPC ....... 248/544, 545, 686, 671, 674, 676, 678, 248/679, 346.02, 346.03, 346.06, 346.5
See application file for complete search history.

(56) References Cited

U.S. PATENT DOCUMENTS

| | | | | | |
|---|---|---|---|---|---|
| 3,493,201 | A | * | 2/1970 | Marran | F16M 7/00 248/678 |
| 4,093,164 | A | * | 6/1978 | Borreson | F16F 7/10 248/624 |
| 4,700,923 | A | * | 10/1987 | Lewis, Jr. | F16M 3/00 248/500 |
| 5,149,050 | A | * | 9/1992 | Smith | F16M 5/00 248/679 |
| 5,497,708 | A | * | 3/1996 | Jeruzal | B65D 19/44 108/54.1 |

(Continued)

*Primary Examiner* — Christopher Garft
*Assistant Examiner* — Michael McDuffie
(74) *Attorney, Agent, or Firm* — Lee & Hayes, P.C.

(57) ABSTRACT

Techniques for installing a robotic arm, such as for use in a product packaging environment are described. In an example, a floor-supported plate may define a number of holes to allow connection of the plate to selected locations in the concrete floor. In an example, holes defined in the plate that are in undesirable locations in the concrete floor may not be used to bolt the plate to the floor. In contrast, holes that are in more favorable locations in the plate can be used to bolt the plate to the floor. The floor-supported plate may also be configured with alignment features that assist in connection of one or more supporting or related systems to the plate. Examples of the systems that may be connected to the plate, and/or aligned by contact with the plate, include conveyor systems, case-providing cassette(s), and pallet location and/or alignment guides.

17 Claims, 4 Drawing Sheets

(56) References Cited

U.S. PATENT DOCUMENTS

| | | | | |
|---|---|---|---|---|
| 6,450,782 | B1* | 9/2002 | Sakamoto | F04C 23/00 248/678 |
| 7,028,970 | B1* | 4/2006 | Wiseman | F16M 5/00 108/51.11 |
| 7,036,786 | B1* | 5/2006 | Schura | E04B 1/34347 248/346.03 |
| 7,267,319 | B2* | 9/2007 | Vitrone | F01D 25/28 248/649 |
| 7,739,778 | B2* | 6/2010 | Fiedler | B24B 41/005 29/27 C |
| 8,621,873 | B2* | 1/2014 | Robertson | F01D 25/285 60/796 |
| 8,857,781 | B2* | 10/2014 | Wang | F02B 63/04 248/678 |
| 2004/0240979 | A1* | 12/2004 | Beavers | B65H 31/3045 414/788 |
| 2009/0314924 | A1* | 12/2009 | Settele | B23Q 1/015 248/679 |
| 2011/0073017 | A1* | 3/2011 | Wilson, Jr. | F16M 5/00 108/42 |
| 2015/0028183 | A1* | 1/2015 | Laffont | F16M 9/00 248/679 |
| 2015/0251320 | A1* | 9/2015 | Ueno | B25J 15/0616 414/737 |
| 2016/0123527 | A1* | 5/2016 | Hautaniemi | B01F 15/00448 248/678 |
| 2017/0057021 | A1* | 3/2017 | Yeum | B23K 11/115 |
| 2018/0326507 | A1* | 11/2018 | Halvorsen | B25J 9/0009 |
| 2019/0063669 | A1* | 2/2019 | Ingram | H05K 13/0015 |
| 2020/0325005 | A1* | 10/2020 | Zhang | F16M 11/18 |

* cited by examiner

BASE FOR A ROBOTIC ARM

RELATED APPLICATIONS

This patent application claims priority to U.S. patent application Ser. No. 62/579,115, titled "Base for a Robotic Arm", filed on 30 Oct. 2017, commonly assigned herewith, and hereby incorporated by reference.

BACKGROUND

In a commercial or industrial environment (e.g., a product packaging environment or an assembly line environment, etc.), a robotic arm or supporting structure may be connected to concrete flooring. In many commercial and/or industrial environments, the existing concrete flooring in a facility may be inadequate and/or unsuitable to support the robotic arm. Accordingly, problems with the concrete flooring may result in the need for a section of flooring to be removed, and replacement concrete poured. A first problem with existing concrete flooring is the positioning of thermal expansion separators between two poured surfaces. A second problem with existing concrete flooring is an edge of the concrete surface that is too close to the intended location of the robotic arm.

Additionally, using known systems and methods, it is frequently necessary to drill numerous holes in the concrete flooring, not only to mount the robotic arm, but to mount conveyor systems, guides to precisely locate pallets when delivered, case supply cassettes, and other system components and machinery. Accordingly, a third problem with drilling multiple holes into an existing concrete floor is that, while each hole may be of correct diameter and depth, the locations of one or more holes with respect to the locations of one or more other holes may be incorrect.

The accurate location of such drilled holes is important, and considerable time and money may be spent in installing such components. Additional costs are incurred if the holes are drilled inaccurately.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
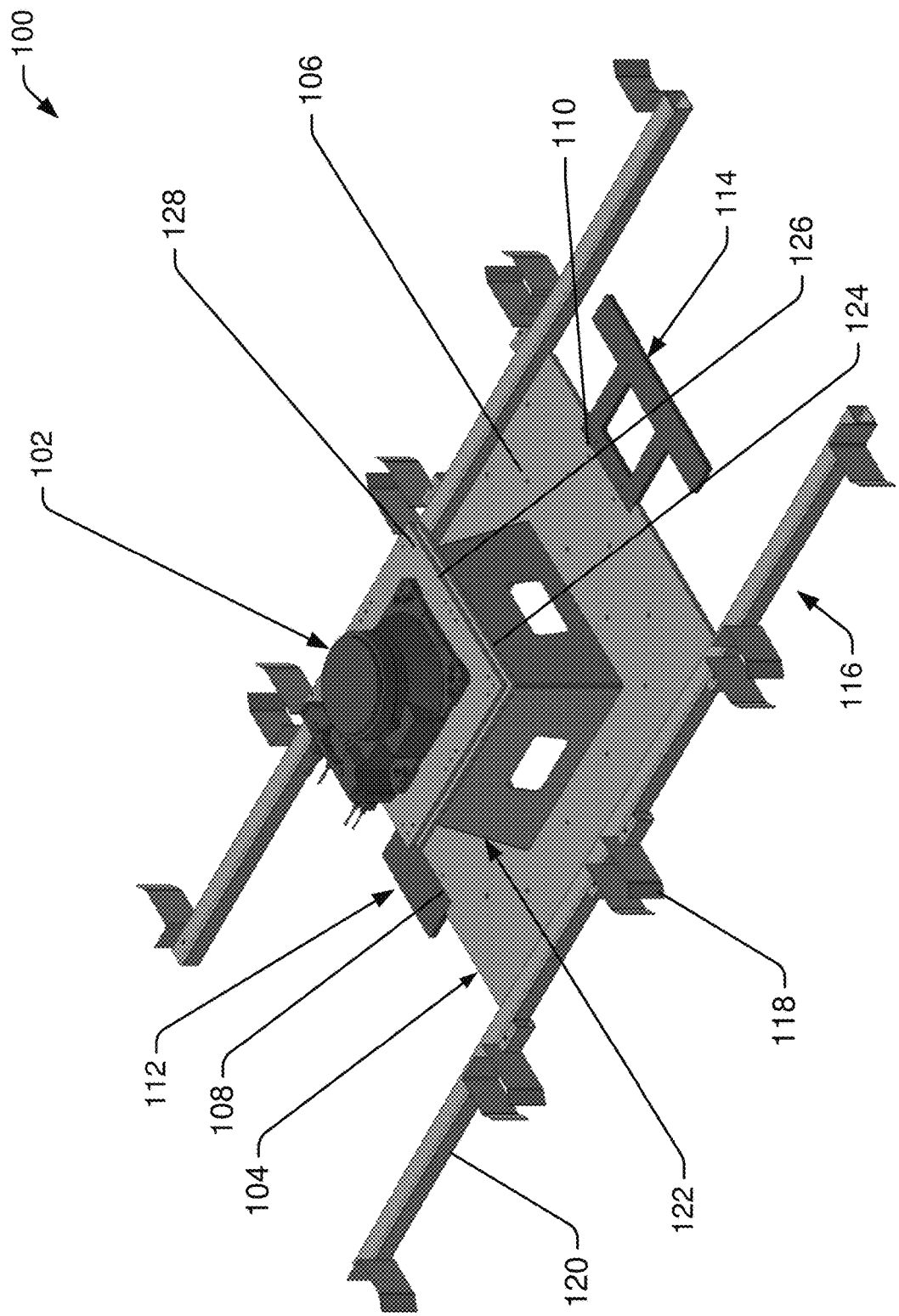
FIG. 1 is a rendered drawing that shows an example base for a robotic arm.

The disclosure describes structures and techniques used to install a supporting base for a robotic arm and/or other machinery within a facility. The base may support machinery, such as a robotic arm, such as for use in a product-packaging environment or in an assembly-line environment. In an example of a supporting base, a floor-supported plate is adapted for connection to a floor (e.g., a concrete floor) and for support of the robotic arm. The floor-supported plate may define a number of fastener holes to allow connection of the plate to selected locations in the concrete floor. In an example, holes defined in the plate that are in undesirable locations in the concrete floor may not be used to bolt (or otherwise fasten) the plate to the floor. Locations may be undesirable if they are too close to an edge of the concrete floor, or too close to a thermal expansion divider between two concrete surfaces. In contrast, holes that are in more favorable locations in the plate can be used to bolt the plate to the floor. Thus, the plate may define holes in a plurality of locations, to thereby allow installation technicians and/or engineers to select holes that are appropriate for use with a concrete floor having particular characteristics. Having selected the plurality of holes in the floor-supported plate, the technicians may drill corresponding holes in the concrete, and mount the floor-supported plate in a precisely controlled and supported manner.

The supporting base for a robotic arm may also be configured with alignment features that assist in the accurate positioning and connection of one or more related systems or machines to the floor-supported plate or other locations of the supporting base. Examples of the systems that may be connected to the supporting base, and/or aligned by contact with the floor-supported plate, include conveyor systems, case-providing cassette(s), and pallet location and/or alignment guides. These systems may be oriented and located within the reach of the robotic arm (i.e., within a circumference of reach of a robotic arm). In an example, the arm is able to grasp a case from the cassette, open the case, load the case with goods from in-coming conveyor, and place the case on an out-going conveyor. Alternatively, goods and/or loaded cases may be placed on pallets. Holes, edges, notches and/or other alignment features may be defined in the supporting base (e.g., in the floor-supported plate of the base) for attachment of such systems, including conveyor assemblies, pallet alignment guides, and others, according to a predetermined and precise spacing. Accordingly, various systems (e.g., conveyor systems) may be attached to the floor-supported plate or other locations of the supporting base in a manner that precisely locates each system.

A support stand may be located on (e.g., attached to) an upper surface of the floor-supported plate, and may support and locate the robotic arm at a desired elevation.

Upper and lower adjustment plates (e.g., a top plate and a bottom plate) may be supported by an upper surface of the support stand. The lower adjustment plate may be attached to an upper surface or other portion of the support stand, and may not be precisely level. For example, if the floor is not precisely level the lower adjustment plate may also not be level. However, by careful adjustment of bolts (or other fasteners) connecting the upper and lower adjustment plates, the upper adjustment plate may be precisely leveled. In an example, respective corners of the upper and lower adjustment plates may be slightly different distances apart, resulting in an upper adjustment plate that is level and at a preferred elevation. The robotic arm may be attached to the upper adjustment plate. Accordingly, the upper adjustment plate provides a level and precisely elevated support surface for the robotic arm.

In operation, use of the base for supporting a robotic arm allows connection to concrete floors having thermal expansion dividers, edges or other structures that would have previously indicated need for replacement of a section of concrete floor. In particular, holes defined in a floor-supported plate of the base for supporting a robotic arm that are poorly positioned (e.g., too close to thermal expansion dividers) are not used, while other holes defined in the plate may be used to bolt and/or fasten the plate to the floor.

Use of a base having one or more plates, attached to a rigid flooring material, speeds, simplifies and/or improves the outcome of assembly of a complex system. By configuring the plate(s) to include one or more alignment structures, the plate(s) and associated alignment structures may orient and connect various system components (e.g., robotic arm(s), conveyor(s) and/or pallet-locating guide(s)), according to a precise spatial relationship. Accordingly, once the floor-supported plate(s) are securely attached, use of the plate(s) speed installation of a robotic arm and/or other assemblies (e.g., conveyor assemblies, case cassette(s), pallet guide(s), etc.). Because the base (or the floor-supported plate of the base) provides alignment features, the holes that must be drilled in concrete flooring—to support other assemblies, such as conveyors—may be more accurately located and/or reduced in number. Because the upper adjustment plate may be positioned at a desired location with respect to the lower adjustment plate, the robotic arm may be mounted on a level surface, or a surface that is more nearly level than the floor, and the robotic arm may be mounted at a preferred elevation.

Example System

FIG. 1 shows an example base 100 for use with a robotic arm 102 (only lower portions of the robotic arm are shown) and/or other machinery, such as conveyor belts, cassettes holding cardboard boxes, etc. The base provides a number of advantageous features, structures and techniques for use.

The base 100 is adapted for connection to concrete floors having edges of concrete surfaces and/or dividers between concrete sections that are in unfortunate locations with respect to intended locations of system components. However, because a plurality of fastener holes defined by a floor-supported plate 104 of the base 100 may include more than the number of holes actually used, the base may provide holes located over locations in the concrete floor that are acceptable for use with fasteners. Additionally or alternatively, the floor-supported plate 104 of the base 100 may be designed to include holes located over strategic and/or preferred locations in the concrete floor that are acceptable for use with fasteners. That is, hole locations in the floor-supported plate 104 may be designed for a particular location in a particular facility and/or a particular overall system configuration in that facility. Accordingly, by advantageously selecting from among (or designing locations of) a plurality of holes defined in the floor-supported plate 104 of the base 100, and utilizing holes that are sufficiently distant from problems in the concrete, the base can be connected to existing concrete without requiring replacement concrete.

Additionally, alignment features in the base allow for the connection of systems, such as conveyor systems, pallet alignment and positioning systems, and/or case (e.g., cardboard box) cassettes. By connecting such systems using the alignment features, the distance, orientation and position of each system is controlled. Accordingly, the careful measurement required to locate systems is performed more easily by defining locations for holes on the floor-supported plate 104. Moreover, by connecting such systems to the base 100, it is frequently the case that fewer holes in the concrete flooring are required.

A floor-supported plate 104 is designed to be supported by the floor—such as a concrete or other solid floor—of a facility. The floor-supported plate may not actually be floor-supported until installed, but (to distinguish it from other plates) may be called a floor-supported plate even before installation. The floor-supported plate may be substantially larger than the upper adjustment plate 126 to which the robotic arm 102 is attached. The floor-supported plate 104 may include or define a number of holes 106. In an example, a sub-set of the fastener holes 106 may be used to attach the floor-supported plate 104 to a concrete (or other material) floor. The sub-set is selected to avoid using fasteners (e.g., bolts) in locations wherein the concrete floor is weak, such as near its edge or near thermal dividers between two concrete sections. According to the example, the plate may be designed to support a robotic arm and/or other systems, and spatial relationships between those systems, but specific foreknowledge of aspects of the floor to which it will be attached may not be required. In the example, engineers and/or technicians, upon determination of the nature of the floor, may select and utilize appropriate fastener holes 106 defined in the plate 104, while avoiding use of other holes defined in the plate. In an alternate example, an engineering design of the floor-supported plate 104 may prescribe locations for the fastener holes 106 that are calculated based at least in part on the system to be designed, including the robotic arm, conveyors, pallet alignment tools, etc., and based at least in part on knowledge of the size, shape, nature and characteristics of the floor in the facility to the system.

An alignment feature 108, 110 may include a shape defined in the floor-supported plate 104, or holes defined in or by the plate, that are used to align and position a system to be associated with the robotic arm 102. In the example of FIG. 1, the alignment features 108, 110 are notches that allow insertion of a foot-plate 112, 114 of respective incoming and outgoing conveyor systems. Because the alignment features 108, 110 are sized to fit the conveyor components (e.g., foot-plates or other components) the orientation, location and spacing of the conveyors is fixed with respect to the robotic arm 102. While the alignment features are shown as notches 108, 110, other features such as fastening holes, grooves, latches or any combination of features usable to connect a module (e.g., a conveyor system) to the base 100 may be used. The alignment features and their connection to system components orients multiple system components locked together in a desired spatial relationship. Additionally, the alignment features and their connection to system components orients system components within the reach of the robotic arm mounted on the base 100.

Optionally, a pallet alignment guide 116 may be used to help confine pallets (e.g., pallets containing merchandise to be packaged) to a desired location with respect to the robotic arm 102. In the example shown, pallet alignment guide 116 includes pallet guides 118 that are carried by a tube or beam 120. The tube or beam 120 may be positioned against the floor-supported plate 104, or restrained by an alignment feature or bolts passing through holes defined in calculated locations. Accordingly, the pallets inserted between pallet guides 118 deliver merchandise, cases (e.g., folded cardboard boxes) or other materials to exact location expected by programming associated with the robotic arm.

Optionally, a support stand 122 elevates the robotic arm 102 to a desired height off the plate 104. A lower adjustment plate 124 is mounted on a top surface or edge of the support stand 122. The lower adjustment plate 124 is approximately as level as the floor. However, that may not be as accurate as desired. To achieve a more level surface on which to mount the robotic arm 102, an upper adjustment plate 126 is configured to be separated from the lower adjustment plate 124 by desired distances. In an example, each corner of the upper adjustment plate 126 is separated from each respective corner of the lower adjustment plate by a slightly different distance. Those distances may be precisely controlled by bolts 128 or other fasteners. Adjustment of the bolts allows adjustment of the upper adjustment plate 126 to a position that is more nearly level than the lower adjustment plate 124. Adjustment of the bolts also allows adjustment of the upper adjustment plate 126 to a position that is a precise elevation, which may be indicated by an engineering design. In an example, fasteners in each corner elevate all four corners of the upper adjustment plate 126 to the same elevation. In example installations, the upper adjustment plate 126 is very nearly level, and may be more level than the floor. In such installations, the upper adjustment plate 126 supports the robotic arm 102 at a prescribed location/elevation that is very nearly level.

Figure 2:
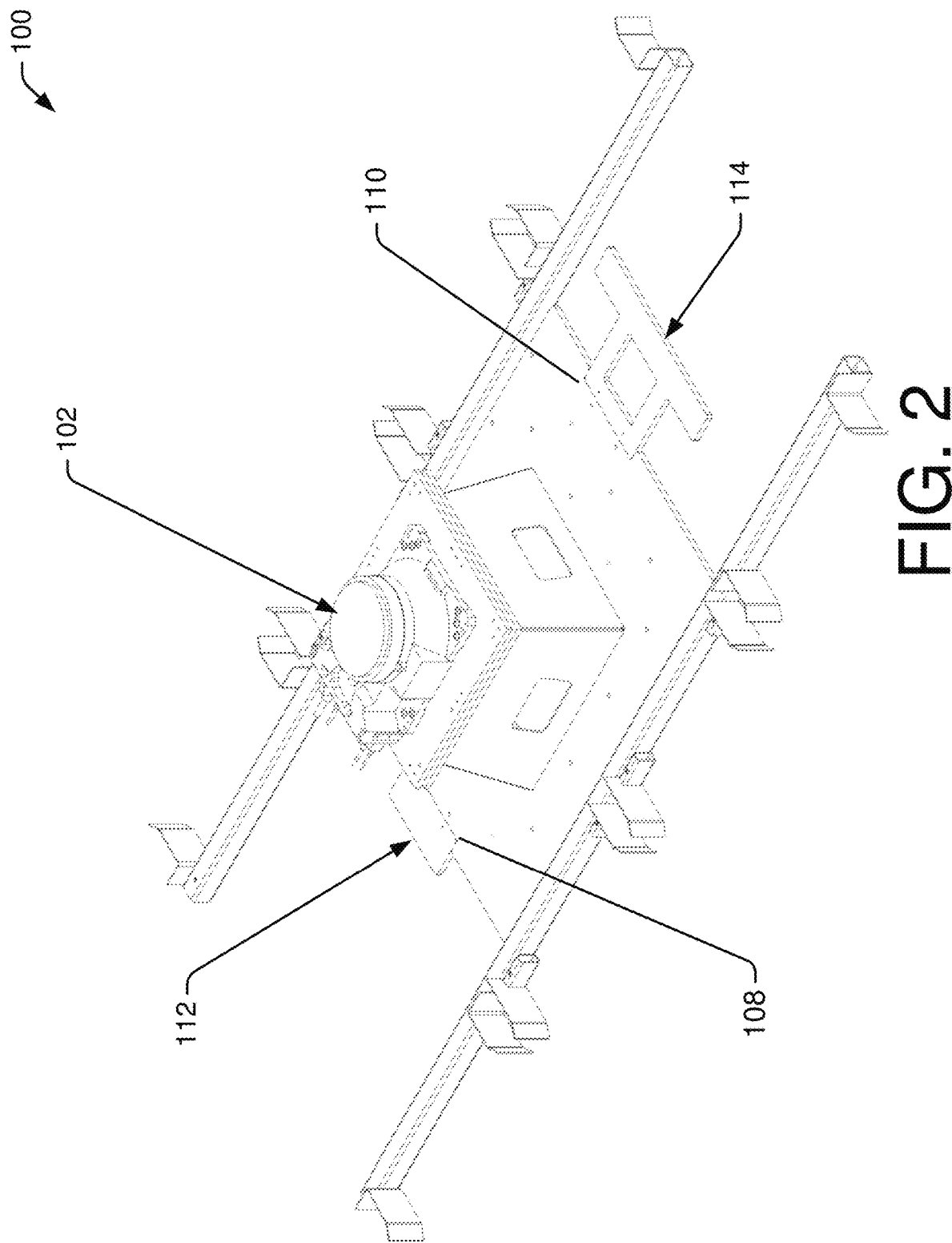
FIG. 2 is a line drawing that shows an example base for a robotic arm.

FIG. 2 shows an example base 100 for a robotic arm 102. In the example, the alignment feature 108, 110 are defined as notches in the floor-supported plate 104. The alignment features 108, 110 allow insertion of foot-plates 112, 114 of two components, such as incoming and outgoing conveyor systems. Because the alignment features 108, 110 are sized to fit the conveyor components (e.g., foot-plates or other components) the orientation, location and spacing of the conveyors or other components is fixed with respect to the robotic arm 102.

Example Methods

Figure 3A:
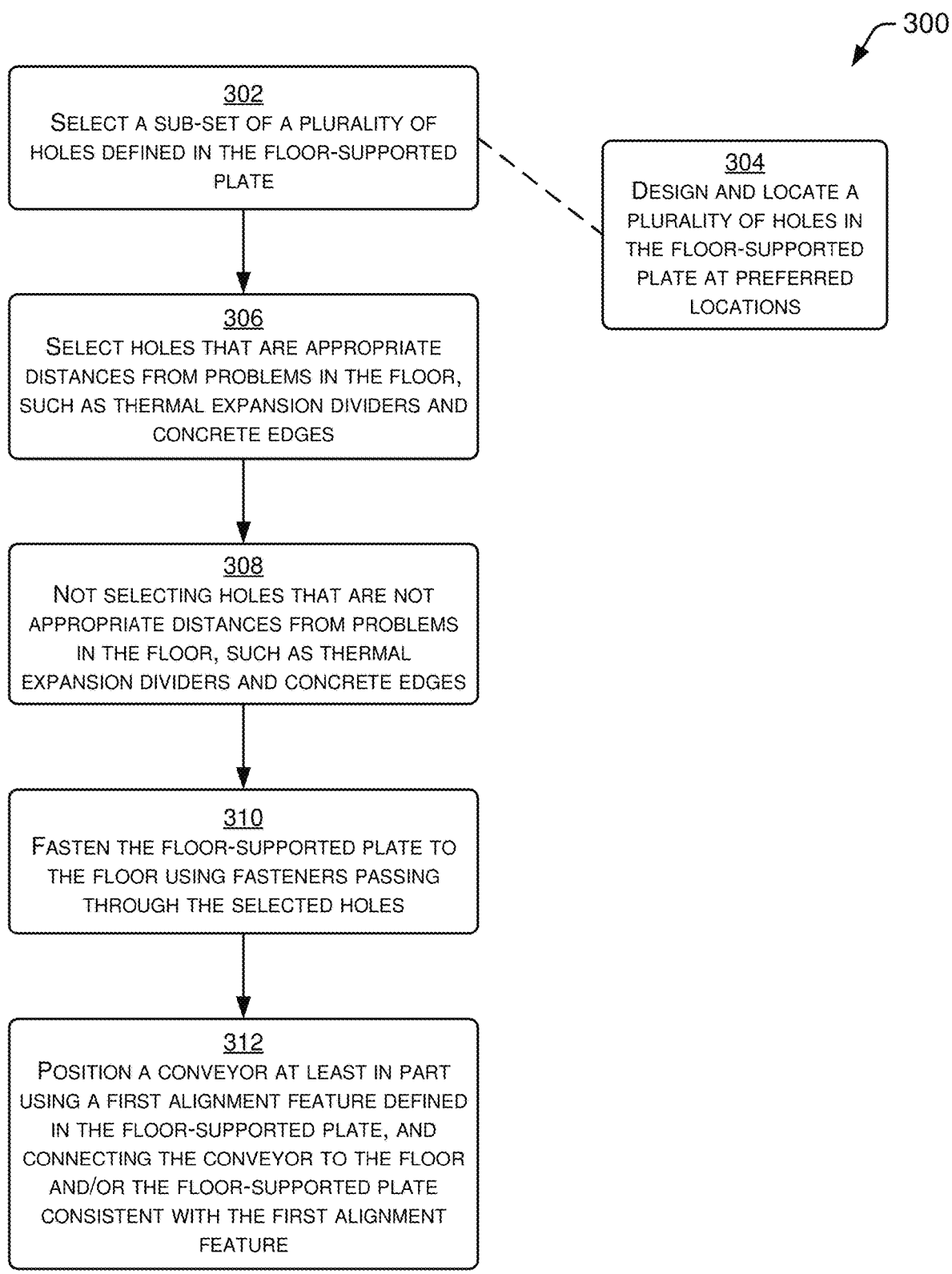
FIGS. 3A and 3B are flow diagrams showing methods and techniques of use.
Figure 3B:
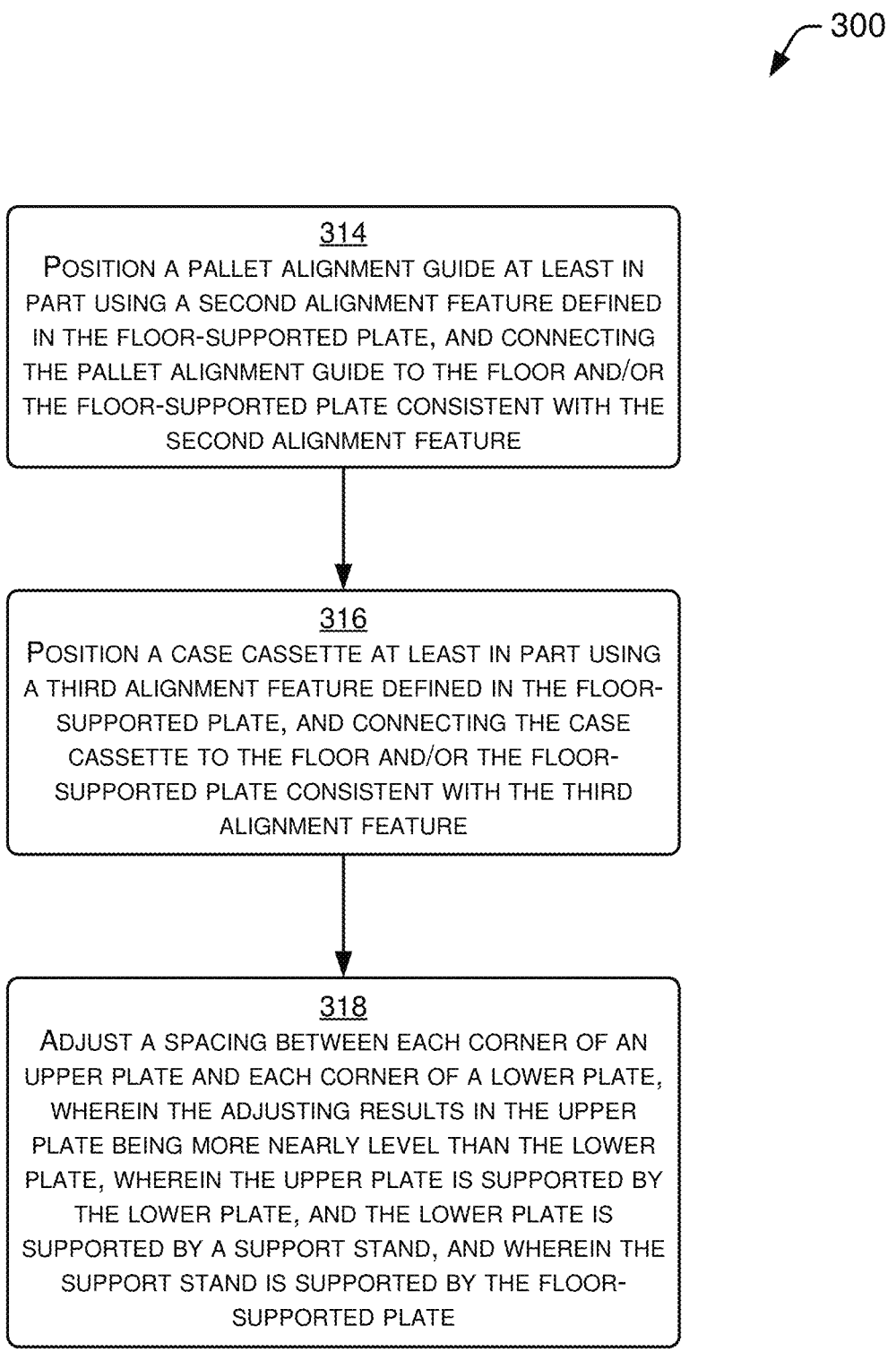

FIGS. 3A and 3B show example methods 300 by which a base for a robotic arm may be used and installed.

At block 302, a sub-set of a plurality of holes defined in the floor-supported plate is selected. In the alternative of block 304, at least some of the holes defined in the floor-supported plate may be located at preferred, designed and/or engineered locations. The locations may be based at least in part on the system to be built, and the facility in which it is to be built.

In an example, at block 306, holes are selected (or designed) that are appropriate distances from problems in the floor, such as thermal expansion dividers and concrete edges. In a further example, at block 308, holes are not selected (and/or are not part of a design) that are not appropriate distances from problems in the floor, such as thermal expansion dividers and concrete edges.

At block 310, the floor-supported plate is fastened to the floor using fasteners passing through the holes at selected and/or designed locations.

At block 312, a conveyor is positioned at least in part using a first alignment feature defined in the floor-supported plate, and connecting the conveyor to the floor and/or the floor-supported plate consistent with the first alignment feature.

At block 314, a pallet alignment guide is positioned at least in part using a second alignment feature defined in the floor-supported plate. The pallet alignment guide is connected to the floor and/or the floor-supported plate consistent with the second alignment feature.

At block 316, a case cassette is positioned at least in part using a third alignment feature defined in the floor-supported plate. The case cassette is connected to the floor and/or the floor-supported plate consistent with the third alignment feature.

At block 318, a spacing between each corner of an upper plate and each corner of a lower plate is adjusted. In an example, the adjusting results in the upper plate being more nearly level than the lower plate. In a further example, the upper plate is at a precisely selected elevation and/or location, based at least in part on the adjusting. In the example, the upper plate is supported by fasteners and the lower plate, and the lower plate is supported by a support stand. In the example the support stand is supported by the floor-supported plate.

CONCLUSION

Although the subject matter has been described in language specific to structural features and/or methodological acts, it is to be understood that the subject matter defined in the appended claims is not necessarily limited to the specific features or acts described. As an example. Rather, the specific features and acts are disclosed as exemplary forms of implementing the claims.

What is claimed is:

1. A system, comprising:
a base, comprising:
  a floor-supported plate, the floor-supported plate comprising:
    one or more alignment features configured to connect to one or more respective systems, and to align each connected system with the floor-supported plate in a predetermined spatial relationship, wherein one of the one or more respective systems are a conveyor system, a pallet alignment guide or a case cassette; and
    a plurality of fastener holes for fasteners defined in the floor-supported plate to attach the floor-supported plate to a floor;
  a support stand, attached to the floor-supported plate;
  a lower adjustment plate, attached to the support stand; and
  an upper adjustment plate, supported by the lower adjustment plate and by adjustable fasteners that allow each corner of the upper adjustment plate to be separated from a corresponding corner of the lower adjustment plate by a distance that makes the upper adjustment plate more level than the lower adjustment plate; and
a robotic arm, attached to the base and elevated to a desired location by the support stand, wherein the base locates the robotic arm within reach of an incoming conveyor system, and wherein the incoming conveyor system is attached to an alignment feature of the base.

2. The base of claim 1, wherein the one or more alignment features comprises:
a first notch defined to fit a foot plate of the incoming conveyor system; and
a second notch defined to fit a foot plate of an outgoing conveyor system.

3. The base of claim 1, wherein the one or more alignment features comprises:
an alignment feature configured to orient the pallet alignment guide within a range of reach of the robotic arm.

4. The base of claim 1, wherein the one or more alignment features are configured to connect to:
the incoming conveyor system;
the pallet alignment guide; and
the case cassette;
wherein the alignment features locate the conveyor system, the pallet alignment guide and the case cassette within a range of reach of the robotic arm.

5. The base of claim 1, wherein the plurality of fastener holes includes sufficient fastener holes to allow fasteners to make a connection of the floor-supported plate to the floor even when one or more fastener holes are unavailable for use due to characteristics of the floor.

6. The base of claim 1, wherein the plurality of fastener holes is defined in locations based at least in part on characteristics of the floor.

7. The base of claim 1, wherein the one or more alignment features locate the conveyor system, the pallet alignment guide and the case cassette within a range of reach of the robotic arm.

8. The base of claim 1, wherein the adjustable fasteners allow adjustment of a height of the upper adjustment plate.

9. The base of claim 1, wherein the base locates the robotic arm within reach of an outgoing conveyor system, and wherein the outgoing conveyor system is attached to at least one alignment feature of the base.

10. The base of claim 1, wherein the one or more alignment features comprises the pallet alignment guide.

11. A system, comprising:
 a base, comprising:
  a floor-supported plate, the floor-supported plate comprising a plurality of fastener holes for fasteners defined in the floor-supported plate to attach the floor-supported plate to a floor, wherein the plurality of fastener holes includes sufficient fastener holes to allow fasteners to make a connection of the floor-supported plate to the floor even when one or more fastener holes are unavailable for use due to characteristics of the floor;
  one or more alignment features configured to connect to one or more respective systems, and to align each connected system with the floor-supported plate in a predetermined spatial relationship, wherein one of the one or more respective systems are a conveyor system, a pallet alignment guide or a case cassette;
  a support stand, attached to the floor-supported plate, wherein the one or more alignment features are configured to locate the conveyor system;
  a lower adjustment plate, attached to the support stand; and
  an upper adjustment plate, supported by the lower adjustment plate and by adjustable fasteners; and
 a robotic arm, attached to the base and elevated to a desired location by the support stand, wherein the base locates the robotic arm within a circumference of reach of an incoming conveyor system, and wherein the incoming conveyor system is attached to an alignment feature of the base.

12. The base of claim 11, wherein the adjustable fasteners allow adjustment of a height of the upper adjustment plate.

13. The base of claim 11, wherein the adjustable fasteners allow each corner of the upper adjustment plate to be separated from a corresponding corner of the lower adjustment plate by a distance that makes the upper adjustment plate more level than the lower adjustment plate.

14. The base of claim 11, wherein the one or more alignment features comprises:
 an alignment feature configured to orient the pallet alignment guide within a range of reach of the robotic arm.

15. The base of claim 11, wherein the one or more alignment features are configured to connect to:
 the conveyor system; and
 the pallet alignment guide.

16. The base of claim 11, wherein the plurality of fastener holes is configured to allow the base to be bolted to the floor.

17. A method, comprising:
 locating a floor-supported plate on a floor;
 selecting a sub-set of a plurality of holes defined in the floor-supported plate, wherein the selecting comprises:
  selecting holes that are appropriate distances from problems in the floor, such as thermal expansion dividers and concrete edges; and
  not selecting holes that are not appropriate distances from problems in the floor, such as thermal expansion dividers and concrete edges;
 fastening the floor-supported plate to the floor using fasteners passing through the selected holes;
 positioning an incoming conveyor system at least in part using a first alignment feature defined in the floor-supported plate, and connecting the incoming conveyor system to at least one of the floor and the floor-supported plate consistent with the first alignment feature;
 positioning a pallet alignment guide at least in part using a second alignment feature defined in the floor-supported plate, and connecting the pallet alignment guide to at least one of the floor and the floor-supported plate consistent with the second alignment feature;
 positioning a case cassette at least in part using a third alignment feature defined in the floor-supported plate, and connecting the case cassette to at least one of the floor and the floor-supported plate consistent with the third alignment feature;
 adjusting a spacing between each corner of an upper plate and each corner of a lower plate, wherein the adjusting results in the upper plate being more nearly level than the lower plate, wherein the upper plate is supported by the lower plate, and the lower plate is supported by a support stand, and wherein the support stand is supported by the floor-supported plate; and
 attaching a robotic arm to the support stand, wherein the attachment locates the robotic arm within reach of the incoming conveyor system.

* * * * *